Sept. 10, 1963  H. PICKET  3,103,460
HONEYCOMB PANEL
Filed Jan. 21, 1963

INVENTOR.
HAROLD PICKET
BY
ATTORNEY.

United States Patent Office 3,103,460
Patented Sept. 10, 1963

3,103,460
HONEYCOMB PANEL
Harold Picket, Sarasota, Fla., assignor to The Glidden Company, Cleveland, Ohio, a corporation of Ohio
Filed Jan. 21, 1963, Ser. No. 252,787
11 Claims. (Cl. 161—69)

This invention relates to structural panels and methods of making the same. More particularly, the invention is concerned with lightweight panels having synthetic resin facings which are highly resistant to delamination and novel light transmitting characteristics, such panels being particularly useful in the building construction and related fields.

An object of this invention is to provide an improved lightweight cellular panel having a cellular core with the cells thereof opening on opposite sides of the core, together with synthetic resin facings for the core which are bonded to the core edges in a manner which is highly resistant to delamination and peeling and further, provides novel light transmitting characteristics which enhances the architectural qualities of the completed panel.

Another object of this invention is to provide an improved cellular panel of the character described wherein a preformed cellular core is associated with a freshly cast synthetic resin facing layer whereby the core edges are embedded in the resin layer to a determined depth within the resin facing layer, the resin facing layer forming fillets about the edges of each cell of the core to securely integrate the core to the facing layer and to provide means for modifying the light transmitting characteristics of the resin facing layer.

A further object of this invention is to provide an improved light transmitting structural panel having a cellular core and resin facing layers of a transparent or translucent character integrated with the edges of the core, the facing layers being of a character to provide selected structural qualities for the panel as a whole.

Still another object of this invention is to provide a light transmitting panel of the character described, in which the synthetic resin facing layers are of a stratified character, the various strata being formulated to provide an integral facing layer of desired structural and light transmitting properties.

Yet another object of this invention is to provide a structural panel of the character described which comprises a lightweight cellular core and facing and edge encasing portions of synthetic resin to fully encase the core to protect the same against deteriorating influences, the panel exhibiting good structural values and light transmitting properties which enhance the architectural qualities thereof.

Yet a further object of this invention is to provide improved methods for making light transmitting structural panels by associating cellular cores with synthetic facing layers in a novel manner.

Other objects of this invention will in part be obvious and in part hereinafter pointed out.

Essentially, structural panels of the instant invention comprise a cellular core which may be of the egg-crate or honeycomb type, the core edges being embedded in the inner portions of cast resin layers; the resin layers upon cure securely bonding to the core edges and providing fillets at the periphery of each core cell at the embedded edge thereof; such fillets modifying the light transmitting characteristics of the facing layers.

Figure 1:
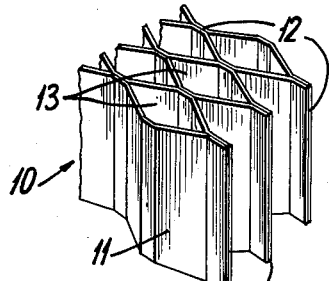
FIG. 1 is a perspective view of a portion of cellular core material of the honeycomb type, which forms an element of a panel embodying the invention.
Figure 2:
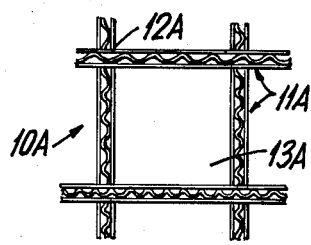
FIG. 2 is a top plan view of a portion of an alternative form of cellular core material.
Figure 3:
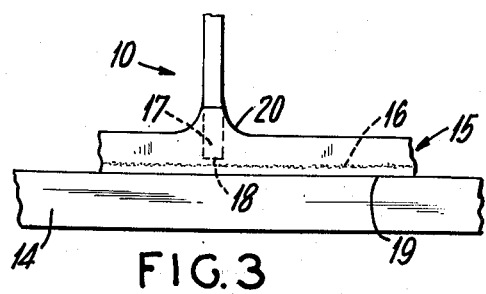
FIG. 3 is an elevational view showing one form of resin facing for the cellular core.
Figure 6:
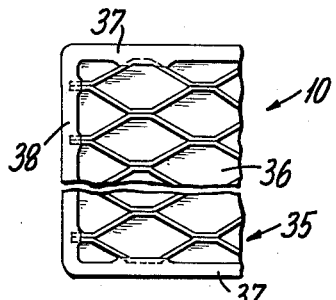
FIG. 6 is a top plan view of a portion of a panel embodying the invention wherein the edges thereof are encased in protective resin.

Thus, as shown in FIG. 1, a core portion is shown at 10 and is of the honeycomb type. The core 10 is made in a conventional manner from strips of paper, paperboard, plastic, foil or the like, as indicated at 11. The strips 11 have a width proportioned to the desired thickness of the finished core. Strips 11 are secured together at spaced intervals 12 in a known manner, with or without precorrugation of the strips, to form a cellular structure having cells 13 opening on opposite sides of the core and having a determined sectional configuration, which is shown as being hexagonal, for purpose of illustration. Alternatively, the core may be formed from corrugated boards 11A interfitted at 12A in egg-crate style, to provide cells 13A of square cross section as shown in FIG. 2.

The cellular core 10 or 10A is provided with facing layers of cast synthetic resin which is of the curable, thermosetting type including polyester and epoxy resins. To this end, a flat casting surface 14 is provided and which takes the form of a table or the like of a size to accommodate the panel to be formed.

A thermosetting polyester resin of the type hereinafter described, is cast on table 14 to form a layer 15 which may have a thickness of about 1/8". An unwoven mat of glass fiber 16 is laid over the wet resin and rolled down into the resin layer. Mat 16 is made up of strands of fiber about 2" long with a weight of 1.5 to 2.0 oz. per sq. ft. The mat 16 when compressed within resin layer 15, has a thickness not exceeding 1/16". The glass fiber forms a minor portion of the resin layer and being in the proportion of about 1 part of glass fiber to 3 parts of resin, all by weight.

The core 10 is then placed over the freshly cast resin layer 15 with the edges 17 thereof embedded therein to a point 18 spaced inwardly of the outer face 19 of the resin layer. The resin layer 15 forms distinct fillets 20 about the periphery of core edges 17, said fillets having a "climb" of from 1/32 to 1/8". The resin layer 15 is cured, preferably at room temperature to form a hard facing layer for the core 10. The operation is repeated to provide a facing layer for the other side of core 10.

For the purpose of illustration, resin layer 15 may be made as follows:

Example A

A thermosetting polyester resin is made by reacting 2 mols of 1,3-propylene glycol with 1 mol of maleic anhydride and 1 mol of phthalic anhydride with removal of water until an acid No. of 35 is obtained. 70 parts of the cooled reaction product is dissolved in 30 parts, all by weight of styrene monomer. The resultant polyester resin is inhibited in storage by 0.01% by weight of hydroquinone. The curing catalyst is methyl ethyl ketone peroxide in dimethyl phthalate plasticizer (60% MEK peroxide–40% DM by weight) and is mixed in the proportion of 4 liquid oz. of catalyst per gallon of resin solution.

The resin cures at room temperature (80° F.) and a curing accelerator such as cobalt octoate may be added in the proportion of 0.5 liquid oz. of 12% cobalt octoate in a mixture of butanol-xylene (50–50) per gallon of resin.

Figure 4:
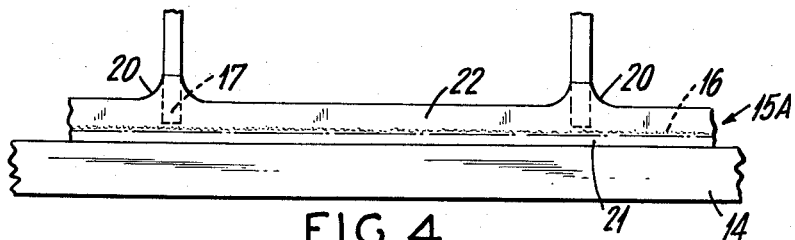
FIG. 4 is an elevational view showing another form of resin facing for the cellular core.

As shown in FIG. 4, a facing layer 15A of light transmitting curable thermosetting resin may be bonded to core 10. In this case, a gel coat of resin 21 is cast on table 14 to a depth of 2–4 mils. Such gel coat, hereinafter described, is partially cured at 80° F. for 20–30 minutes in a dry atmosphere. Application of heat as by use of lamps accelerates the partial cure.

A backup resin layer 22 such as set forth in Example A, supra, is cast over partially cured gel coat 21 and non-woven glass fibers 16 are rolled down in layer 22 as by a grooved aluminum roller, so as to thoroughly wet the fibers and embed the same in the layer 22 which has a thickness of the order of 3/32″.

The core 10, or alternatively, core 10A is then combined with the cast resin layers 21, 22, by embedding core edges 17 in the still wet backup layer 22, forming fillets 20 at the peripheral edges of each cell 13 of the core, such fillets having a climb of from about 1/32″ to about 1/8″, preferably 1/16″. The cure of the resin layers 21, 22 is completed at room temperature to thoroughly integrate the resin layers and to securely bond the same to core 10. The core edge 17 penetrates backup layer 22 to a depth of about 1/16″.

The gel coat 21 is preferably softer and more flexible than backup layer 22. To this end, a polyester resin is formed as follows:

Example B 2 mols of diethylene glycol, 0.4 mol of maleic anhydride and 1.6 mol of adipic acid are reacted with water removal until an acid No. of 35 results. 70 parts of the resultant resin is dissolved in 30 parts of styrene monomer, all by weight. This resin is inhibited by hydroquinone for storage purposes, as previously described, and a cobalt octoate curing accelerator is added as previously described.

One part of the resin of Example B is blended with three parts of the resin of Example A, supra, to produce a semi-rigid polyester resin, which also cures at room temperature. The mixed resin has an elongation of about 10–12% by ASTM test method D638–61T and has very high toughness.

In this case, core 10 or 10A may have similar facings 15A on the opposite sides thereof, each embedding the core edges 17, as described above; each facing having a rigid inner stratum in the form of backup layer 22 and a semi-rigid outer stratum in the form of gel coat 21.

Figure 5:
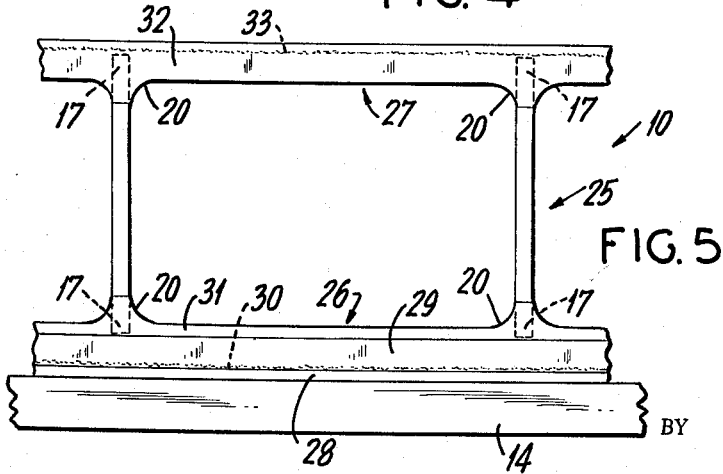
FIG. 5 is a sectional view of a double faced panel showing correlated facing layers.

As shown in FIG. 5, the panel generally indicated at 25 has a facing 26 which is to be exposed to the weather, as when panel 25 is incorporated in an exterior wall structure of a building, while the other facing 27 is exposed to the interior of such building.

In this case, facing layer 26 is made up by first casting on table 14 a layer of curable thermosetting resin 28 of semi-rigid gel coat formed by combining resins of Examples A and B, as described above. Layer 28 has a thickness of about 2–4 mils and is partially cured, as previously described. A backup layer 29 of rigid resin, of the type indicated in Example A is cast over partially cured gel coat 28, non-woven glass fibers 30 are rolled into layer 29 and the layer 29 is partially cured, as previously described.

An inner layer 31 of semi-rigid polyester resin, similar to that of gel coat 28, is cast over the layer 29. The core 10 is then associated with the facing layer 26 to embed the core edges 17 in layer 31, as shown, with the liquid resin of said layer 31 forming fillets 20, as previously described. The cure of layers 28, 29 and 31 is completed, as previously described to form the unitary facing layer 26 in strongly bonded relation to core 10. The layer 29 may have a thickness of about 3/32″ and inner layer 31 a thickness of about 1/32″.

The interior facing 27 is made by casting a single layer 32 of the rigid resin according to Example A, followed by application of non-woven glass fibers as at 33, in the manner previously described, and then applying the opposite side of the core 10 to embed the edges 17 thereof in said layer 32 while the same is still wet, to provide fillets 20, as previously described.

The core edges 17 abut the glass fibers 33, thus locating said core edges in spaced relation to the outer surface of facing 27. Alternatively, facing 27 may be formed by casting outer and inner strata in succession, partially curing the outer stratum, embedding the core edges 17 in the inner stratum while the same is still liquid, and finally curing the facing to integrate the strata and to bond the core thereto, as previously described.

While, the foregoing panels are indicated as including minor amounts of glass fiber, it is understood that such fiber may be omitted. When the glass fiber is incorporated in the resin stratum, the light transmitting characteristics of the resin facings are retained, with modifications thereof due to the fillets 20 at the peripheral edge of each cell of the core.

For interior use, the panel shown in FIG. 5 may be modified so that the inner facing 27 is also applied to the outer or other side of the core, in lieu of facing 26. It has been found that with the multi-strata facings, the outermost gel coat is tough despite the lack of reinforcement thereof, yet is sufficiently flexible to cope with thermal expansion and contraction over a wide range of temperatures. Also, the facing is highly resistant to missiles such as hail, small stones and the like. Similarly, the innermost, unreinforced resin stratum of semi-rigid resin also shows toughness and resistance to the effects of thermal expansion or contraction.

The rigid polyester resin, as in Example A, in unfilled, non-reinforced form, has a tensile elongation of less than 5%, preferably about 1% or less, by ASTM test method D638–61T. The semi-rigid form of resin has a tensile elongation of from 5–40%, and a flexible resin a tensile elongation of from 40–310%.

It will be apparent that the semi-rigid polyester resins described above, as indicated by the blend of resins of Examples A and B, can be made with greater or lesser flexibility by suitable change in the proportions of the mixed resins, to suit given strength requirements. When strength and thermal shock is not a problem, the panels may be made up with the rigid form of polyester as per Example A.

It is understood that a facing layer of resin may be cast in a single layer of desired thickness, followed by partially curing the outermost stratum of the cast layer by localized heating, followed by embedment of the cellular core in the still liquid innermost stratum of the cast resin. The core edges will then rest on the partially cured outermost stratum and the liquid resin will "climb" to form the fillets as previously described. The facing is then completely cured at room or elevated temperature in accordance with the curing catalysts used in the resin formulations.

The appearance of the structural panels made in accordance with the invention may be further enhanced by coloring the resin facing portions closing off selected cells of the core. To this end, when one resin facing has been applied to the core, the assembly has about 12 cc. of polyester resin of Example A with selected tint or pigment added thereto, applied to the inner surface of the facing within selected core cells. The colored resin is spread, if necessary to uniformly coat the inner surface of the resin facing. The applied coating is gelled and the panel completed by applying the other facing to the core.

It is understood that the casting resins forming the facing layers for the cellular core, may have inclusions of metal foil strips or clippings, flakes or beads, fibrous elements and the like, which are effective to modify and enhance the light transmitting or reflecting properties of the facing layers.

The panels of the instant invention may be sealed about their peripheral edges with resin, as indicated in FIG.

6. Thus, the panel 35 with its core 10 and resin facing layers, made in accordance with the foregoing disclosure, indicated at 36, has applied to the edges thereof polyester resin as at 37, 38 which is bonded to the peripheral edge portions of core 10, and is integrated with the resin facing layers 36.

Thus, the panel 35, being provided with planar, continuous surfaces of the peripheral edges thereof, together with smooth outer surfaces on the facing layers thereof; the same may be used for doors, skylights or other panel structure for fitting into openings in a roof, interior or exterior wall of a building structure or the like.

Alternatively, the panels of this invention may be provided with edge framing of wood or wood moulding or other suitable material. The edge framing may be scored or roughened on inner surface portions to assure good bonding to the core by means of polyester resin adhesive or the like.

It is understood that the polyester resins described herein are of the thermosetting type made by dissolving a solution of unsaturated polyester or mixture of polyesters in a polymerizable vinyl monomer solvent, and finally cured by free radical catalysis to cross link with the monomer to form a thermoset copolymer.

Thus, the linear polyester base resins are derived from alcohols including ethylene, propylene, butylene, diethylene, dipropylene, or triethylene glycols and polybasic acids including maleic anhydride, fumaric acid, chloromaleic acid, itaconic acid, citraconic acid, mesaconic acid, phthalic anhydride, isophthalic acid, tetrahydrophthalic anhydride, hexahydrophthalic anhydride, endomethylene tetrahydrophthalic anhydride, tetrachlorphthalic anhydride, hexachloroendomethylene tetrahydrophthalic acid; succinic acid, glutaric acid, adipic acid, pimelic acid, suberic acid, azelaic acid and sebacic acid.

Typical cross linking monomers include styrene, vinyl toluene, methyl methacrylate, alpha methyl styrene, divinyl benzene, dichlorostyrene, diallyl phthalate and triallyl cyanurate. Typical catalysts are of the peroxide type including methyl ethyl ketone peroxide which is in a plasticizer vehicle, hydrogen peroxide and the like. Curing promoters or accelerators include cobalt octoate or cobalt naphthenate. The resins are inhibited with hydroquinone.

As an alternative to the polyester resins, the panels of this invention may be formed with resin facings of epoxy resins. Such resins include the diglycidyl ether-modified reaction product of bisphenol A and epichlorohydrin containing an active diluent, if desired, such as the diglycidyl ether of 1,4-butane diol, which reduces its viscosity and polymerizes with the epoxy resin. Typical specifications of such resins include a viscosity at 77° F. of 5–9 poises, epoxy equivalent of 175–195, specific gravity at 68° F. of 1.14.

To modify the cure of the epoxy resin and to impart flexibility thereto, 2 parts of the epoxy resin are mixed with 1 part of a polyamide resin, by weight. The polyamide resin is a reaction product of ethylene diamine and a dimer acid which is a polymerization product of $C_{18}$ unsaturated aliphatic monobasic acids, principally linoleic acid, the dimer acid having about 83% of a $C_{35}$ dibasic acid with a molecular weight of about 565 and about 1% maximum of $C_{18}$ fatty acids with a molecular weight of about 282; the dimer acid having an acid number of 188–196, saponification value of 192–198. The mixture of epoxy and polyamide resins cures in about 4 hours. The cure is accelerated by adding 4–5 parts of diethylene triamine catalyst to 100 parts of the mixed resins, by weight.

The semi-flexible polyester resin formulations used as the innermost stratum of the resin facing layers for the panel core, may have its viscosity adjusted and reduced by the use of additional styrene or methyl methacrylate to provide desired flow and penetrating properties. Also, such resin formulation may include from 0.25 to 2.0% of a blown silica with an average particle size of the order of 1 micron, to give thixotropy but still allow for fillet formation when the edges of the cellular core are embedded in the resin stratum.

It will be apparent that the resin systems making up the facing layers for the cellular core, may be varied to give desired structural characteristics. One such measure known in the art is the relative toughness index as applied to the cured resin facing. This value is expressed in pounds per sq. in. and is equal to the quotient of the square of the ultimate flexural strength of the panel facing divided by twice the flexural modulus both in p.s.i. units. For good impact resistance and load bearing properties the RTI should be at least about 100 p.s.i. and preferably up to 200 p.s.i. or more.

This application is a continuation in part of application Ser. No. 693,671, filed October 31, 1957, now abandoned.

As various changes might be made in the embodiments of the invention herein disclosed without departing from the spirit thereof, it is understood that all matter herein shown or described shall be deemed illustrative and not by way of limitation except as set forth in the appended claims.

What is claimed is:

1. A light transmitting structural panel consisting of a cellular core having a plurality of similar cells of uniform cross section extending to and opening on the opposite sides of said core, and a light transmitting facing for at least one side of said core consisting of a unitary solid layer of light transmitting resin selected from the group consisting of thermosetting polyester and epoxy resins, the outer edge portions of said core being embedded within an inner portion of said resin layer and bonded thereto, said core edge extending to a plane within said resin layer spaced from the outer exposed surface thereof to provide a continuous facing portion extending outwardly of said plane to said outer exposed surface, said continuous facing portion having a substantially uniform thickness, the inner surface of said resin facing layer comprising separate portions closing off the outer end of each cell of said core, said closing portions having a peripheral fillet of resin material extending from the inner portion of said resin layer into bonded relation with the embedded surface portions of the core edges defining said cells to provide means for modifying the light transmitting characteristics of said facing layer relative to each cell of said core.

2. A light transmitting structural panel as in claim 1 wherein said resin facing layer has distributed therethrough a minor amount of fibrous glass reinforcing material.

3. A light transmitting structural panel as in claim 1 wherein said resin facing layer comprises an inner stratum of substantially rigid thermosetting polyester resin and an outer stratum of semi-rigid thermosetting polyester resin.

4. A light transmitting structural panel as in claim 1 wherein said resin facing layer comprises an inner stratum of semi-rigid thermosetting polyester resin, an outer stratum of semi-rigid thermosetting polyester resin and an intermediate stratum of substantially rigid thermosetting polyester resin, said resin strata being in integrally bonded relation.

5. A light transmitting structural panel as in claim 1 wherein the facing layer on one side of said core consists of an inner stratum of semi-rigid thermosetting polyester resin, an outer stratum of semi-rigid thermosetting polyester resin and an intermediate stratum of substantially rigid thermosetting polyester resin, said resin strata being in integrally bonded relation, the facing on the other side of said core consisting of substantially rigid thermosetting polyester resin.

6. A light transmitting structural panel as in claim 1 wherein the facing layer on each side of said core consists of susbtantially rigid thermosetting polyester resin.

7. A light transmitting structural panel as in claim 1 wherein a coating of colored light transmitting thermosetting synthetic resin is distributed over the inner surface portions of said resin facing layer as defined by selected cells of said core, to further modify the light transmitting characteristics of said panel.

8. A light transmitting structural panel as in claim 3 wherein said inner stratum of resin has a minor amount by weight of glass fiber distributed therethrough.

9. A light transmitting structural panel as in claim 4 wherein said intermediate stratum of resin has a minor amount by weight of glass fiber distributed therethrough.

10. A method of making light transmitting structural panels from a cellular core having a plurality of similar cells of uniform cross section extending to an opening on opposite sides of said core, comprising casting a continuous layer of light transmitting resin selected from the group consisting of curable thermosetting polyester resin and epoxy resin, partially curing a continuous outer stratum of said resin layer and leaving an inner stratum of said resin layer in substantially uncured liquid form, locating said cellular core over the cast resin layer and embedding the edge portions of said core on one side thereof within the liquid inner stratum of said resin layer, portions of said liquid inner stratum of said resin layer extending upwardly about the embedded core edges at each cell thereof to form a peripheral fillet at the edge of each core cell, and completing the cure of said cast resin layer to integrate the inner and outer strata thereof and to bond the fillet portions of said inner stratum of said resin layer to the embedded edge portions of each cell of said core.

11. A method as in claim 10 wherein said first and second mentioned strata of cast resin are successively cast in superposition, the first stratum of said cast resin layer being partially cured when said second stratum of liquid resin is cast thereover.

References Cited in the file of this patent

UNITED STATES PATENTS

| | | |
|---|---|---|
| 2,839,442 | Whitaker | June 17, 1958 |
| 2,828,235 | Holland et al. | Mar. 25, 1958 |
| 2,870,857 | Goldstein | Jan. 27, 1959 |
| 2,951,004 | Martin et al. | Aug. 30, 1961 |

FOREIGN PATENTS

| | | |
|---|---|---|
| 723,621 | Great Britain | Feb. 9, 1955 |